US010592013B2

(12) United States Patent
Mandel-Iaia et al.

(10) Patent No.: US 10,592,013 B2
(45) Date of Patent: Mar. 17, 2020

(54) SYSTEMS AND METHODS FOR UNIFYING TWO-DIMENSIONAL AND THREE-DIMENSIONAL INTERFACES

(71) Applicant: Microsoft Technology Licensing, LLC, Redmond, WA (US)

(72) Inventors: Jordan Page Mandel-Iaia, Kirkland, WA (US); Christopher Michael Becker, Bellevue, WA (US); Jiashi Zhang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/962,868

(22) Filed: Apr. 25, 2018

(65) Prior Publication Data

US 2019/0332189 A1    Oct. 31, 2019

(51) Int. Cl.
*G06F 3/038* (2013.01)
*G09G 5/00* (2006.01)
*G06F 3/0354* (2013.01)
*G06F 3/023* (2006.01)

(52) U.S. Cl.
CPC ............. *G06F 3/038* (2013.01); *G06F 3/023* (2013.01); *G06F 3/03543* (2013.01); *G09G 5/006* (2013.01); *G09G 2354/00* (2013.01)

(58) Field of Classification Search
CPC .. G06F 3/03545; G06F 3/04815; G06F 3/017; G06F 3/041; G06F 3/04883; G06F 2203/04101
See application file for complete search history.

(56) References Cited

U.S. PATENT DOCUMENTS

| 10,191,281 B2 * | 1/2019 | Goto .................... G02B 27/017 |
| 2008/0225007 A1 * | 9/2008 | Nakadaira ........... G06F 3/03545 345/173 |
| 2014/0033141 A1 * | 1/2014 | Samuels ................. G06F 3/017 715/863 |

* cited by examiner

*Primary Examiner* — Nelson M Rosario
(74) *Attorney, Agent, or Firm* — Arent Fox LLP

(57) ABSTRACT

This disclosure relates to systems, devices, and methods for unifying a two-dimensional (2D) interface and a three-dimensional (3D) interface of a computer device, with each interface having unique inputs and displays specific to each dimensionality. The present disclosure provides for identifying a display context value that indicates whether a user is viewing a two dimensional (2D) display of a 2D space or a three dimensional (3D) display of a 3D space of the computer device, as well as identifying an input context value that indicates whether a user input received at an input device is directed toward the 2D space or the 3D space of the computer device, and selecting one of a plurality of operating states of the computer device based on the display context value and the input context value.

20 Claims, 5 Drawing Sheets

|  | Input Context Value - 2D | Input Context Value - 3D |
|---|---|---|
| Display Context Value – 2D | Receiving the toggle input:<br>• Simulates the HMD being put on by the user<br>• Moves keyboard focus to the 3D space | Receiving the toggle input:<br>• Simulates the HMD being put on by the user<br>• Leaves keyboard focus as-is |
| Display Context Value – 3D | Receiving the toggle input:<br>• Simulates the HMD being taken off<br>• Moves keyboard focus to a 3D window | Receiving the toggle input:<br>• Simulates the HMD being taken off<br>• Moves keyboard focus to a 2D window |

FIG. 5

SYSTEMS AND METHODS FOR UNIFYING TWO-DIMENSIONAL AND THREE-DIMENSIONAL INTERFACES

BACKGROUND

A computer graphics system with a two-dimensional (2D) interface and a three-dimensional (3D) interface will take input and have displays specific to each dimensionality. For example, a traditional 2D system will have a mouse, a keyboard, and a monitor, and this 2D system can be extended by adding a 3D system that includes a Head Mounted Display (HMD) and a six-degree-of-freedom (6DOF) controller. These systems can operate in parallel on the same set of applications and data, which creates challenges in determining where input should go and what should be shown on which display. Current Virtual Reality (VR) software solutions use a modal model, where only one form of display and input can be used at a time. That is, a user may either interact with the 2D interface or the 3D interface, such that each interface is mutually exclusive.

Thus, there exists a need for improvement in the interoperability between 2D computer graphics systems and 3D computer graphics systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method of operating a computer device. The method may include identifying a display context value that indicates whether a user is viewing a two dimensional (2D) display of a 2D space or a three dimensional (3D) display of a 3D space of the computer device. The method may also include identifying an input context value that indicates whether a user input received at an input device is directed toward the 2D space or the 3D space of the computer device. The method may further include selecting one of a plurality of operating states of the computer device based on the display context value and the input context value, the plurality of operating states including a 2D input/3D display operating state and a 3D input/2D display operating state. The method may also include operating the computer device according to the selected operating state.

In another example, a computer device for selecting an operating state is disclosed. The computer device may include a memory to store data and instructions and a processor in communication with the memory. The processor may be configured to execute instructions to identify a display context value that indicates whether a user is viewing a two dimensional (2D) display of a 2D space or a three dimensional (3D) display of a 3D space of the computer device. The processor may be configured to execute instructions to identify an input context value that indicates whether a user input received at an input device is directed toward the 2D space or the 3D space of the computer device. The processor may be configured to execute instructions to select one of a plurality of operating states of the computer device based on the display context value and the input context value, the plurality of operating states including a 2D input/3D display operating state and a 3D input/2D display operating state. The processor may be configured to execute instructions to operate the computer device according to the selected operating state.

Another example implementation relates to computer-readable medium storing instructions executable by a computer device. The instructions may include code for identifying a display context value that indicates whether a user is viewing a two dimensional (2D) display of a 2D space or a three dimensional (3D) display of a 3D space of the computer device. The instructions may include code for identifying an input context value that indicates whether a user input received at an input device is directed toward the 2D space or the 3D space of the computer device. The instructions may include code for selecting one of a plurality of operating states of the computer device based on the display context value and the input context value, the plurality of operating states including a 2D input/3D display operating state and a 3D input/2D display operating state. The instructions may include code for operating the computer device according to the selected operating state.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 5 is an example chart illustrating transitions between operating states in response to receiving a toggle input in accordance with an implementation of the present disclosure.

DETAILED DESCRIPTION

Figure 1:
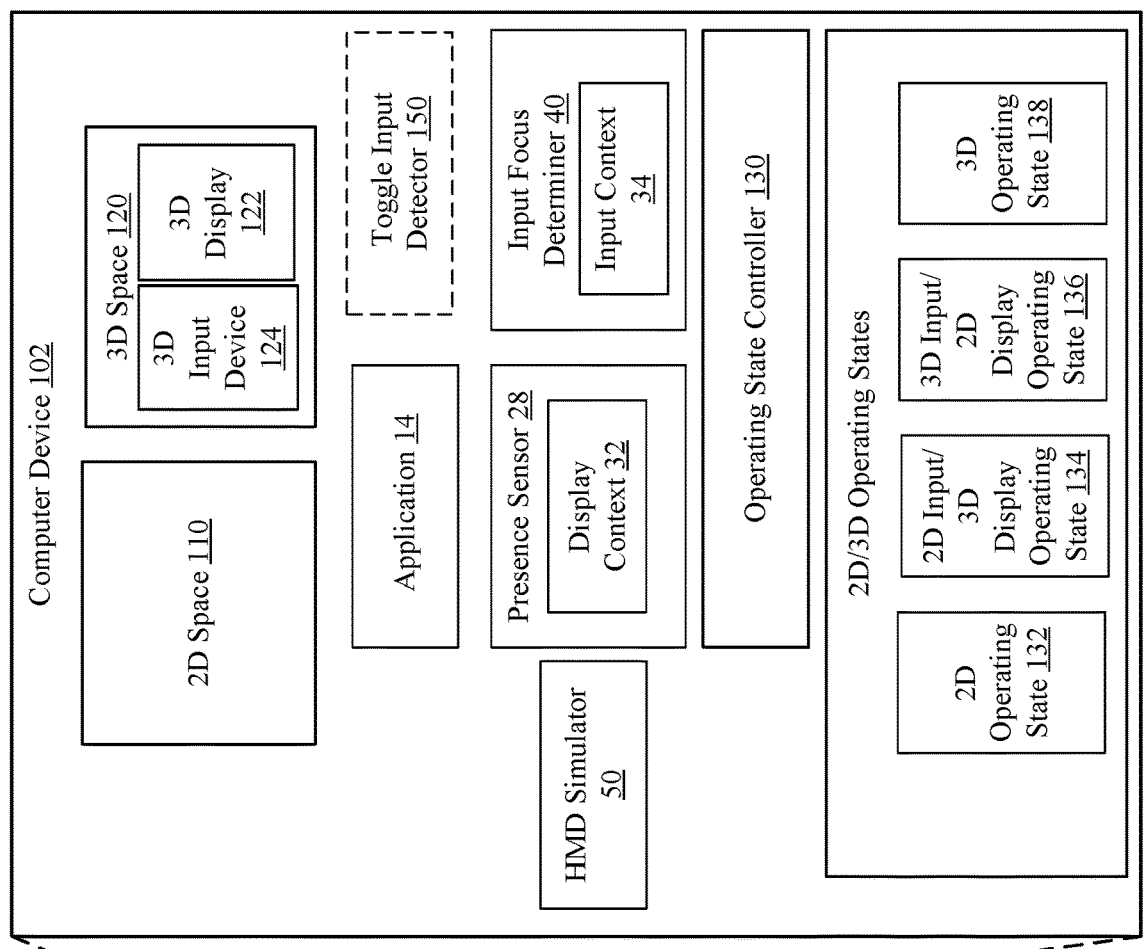
FIG. 1 a schematic diagram of an example computer device having an operating state controller configured to enable a 2D/3D interoperability state in accordance with an implementation of the present disclosure.
Figure 1:
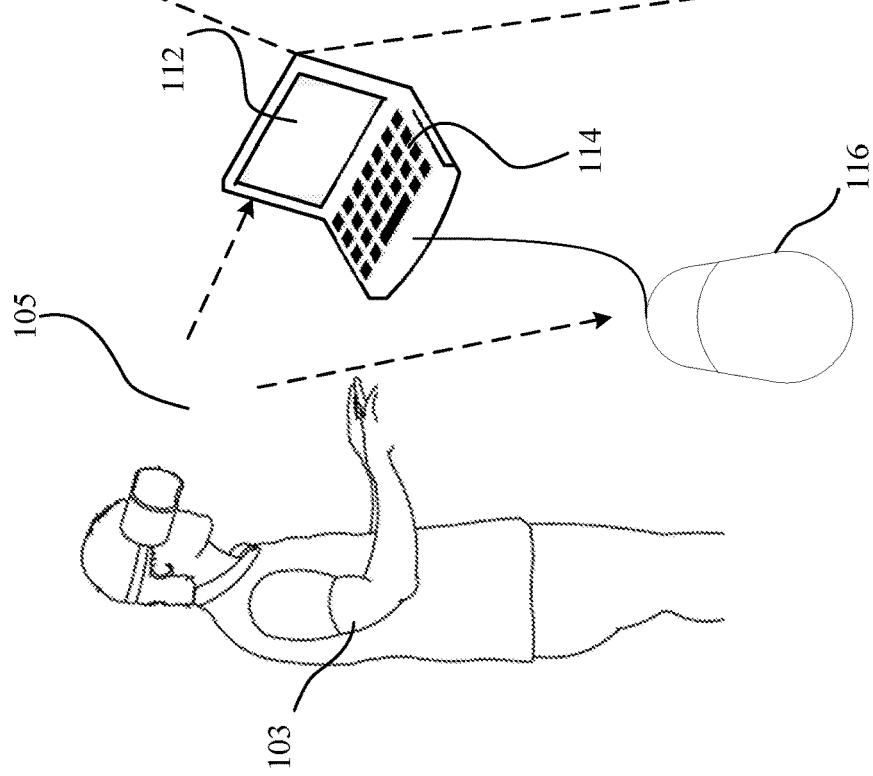

This disclosure relates to systems, devices, and methods for unifying a two-dimensional (2D) interface and a three-dimensional (3D) interface in a computer device, with each interface having unique inputs and displays specific to each dimensionality. The present disclosure describes a computer device having an operating state controller that enables one or more 2D/3D interoperability operating states, or solely a 2D or a 3D operating state, based on certain display context values and an input context values. In general, the display context value indicates whether a 2D or a 3D display is being viewed by the user, and the input context value indicates to which space a user input is being directed. As such, the operating state controller may determine an operating state to be one of a 2D input/2D display state, a 2D input/3D display state, a 3D input/2D display state, or a 3D input/3D display state. As such, the present disclosure enables the use of 2D inputs with a 3D display in the 2D input/3D display state, and the use of a 3D input with a 2D display in the 3D input/2D display state, and enables efficient transitioning between different operating states based on monitoring display context and input context values.

In an implementation, for example, the display context value may track usage of an HMD. For instance, while the HMD is actively worn by the user, the system may assign a value of a 3D display to the display context value, which may indicate that any new application views should be placed into a 3D space presented by the HMD, rather than being placed in a 2D space (e.g., on a 2D display associated with the computing device). In contrast, when the HMD is not worn by the user or is not present and/or plugged in, the display context value may indicate that any new application views should be displayed in the 2D space.

In some implementations, however, the display context value may be overridden by, for example, a user entering one or more keys. This allows the user to manually drive a change of operating states, for instance, when the user wants to direct a specific input to a specific one of the 2D space or the 3D space.

In further implementations, each window in the system may be assigned a display context value indicating where that window is rendered or presented to the user. For example, if a window has a 2D display context value, then the window may be shown in the 2D space. In contrast, if the window has a 3D display context value, then the window may be shown to the user in the HMD.

In still further implementations, an input context value may track whether the user's input focus, e.g., an input into a mouse and/or a keyboard, is being used in the 2D space or the 3D space. For example, the 3D space may allow for interaction with the 2D space from within the HMD, and as such, the input context value may indicate that the context is the 2D space even when the display context value may indicate the 3D space. In some cases, the input context may be based on tracking a current foreground window and determining if that window is associated with a 2D space or a 3D space.

Thus, the combination of input context value and display context value may create four operating states that the user can transition among, including:

2D input context value, 2D display context value—e.g., the user may be at a 2D monitor interacting with 2D window content;

2D input context value, 3D display context value—e.g., the user may be using the HMD while interacting with 2D window content;

3D input context value, 2D display context value—e.g., the user may be at the 2D monitor interacting with 3D window content; and 3D input context value, 3D display context value—e.g., the user is in the HMD interacting with 3D window content.

To determine which state to operate in, the apparatus and methods of the present disclosure may be used to monitor several inputs, namely, the input context and the display context. For example, by monitoring an active foreground window, the present disclosure may track the input context value by reading the foreground window's display context value. Additionally, to determine the display context value, the present disclosure may monitor whether the user is actively wearing the HMD. In this way, the present disclosure may be used to reduce the complexity of user interactions and answer questions about designing the operation of the computing device based on the user's intentions. For example, in a computer device with 2D and 3D interfaces, tracking the input context and the display context to determine an operating state as described by the present disclosure may be used to address questions such as, but not limited to, the following:

On which display should the mouse be shown?

Should a pop-up appear in the 2D or 3D display?

When a new window is created, where should that window be placed—in the 2D space or inside the 3D space?

Upon clicking a link, should the content that opens in response to the link be placed in the 2D space or inside the 3D space?

When the user issues a voice command to the system, should the command be handled in the context of the 2D space or the 3D space?

Figure 2:
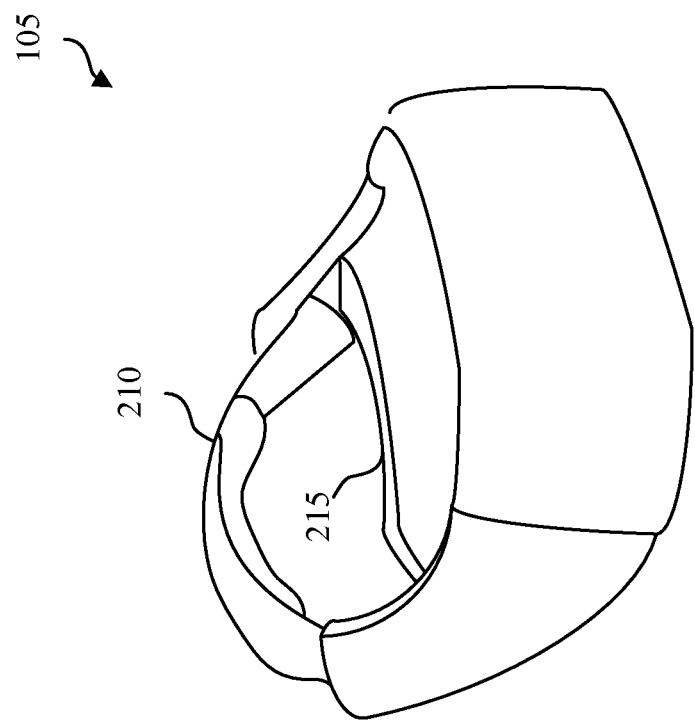
FIG. 2 is a schematic diagram of an example head-mounted display (HMD) in accordance with an implementation of the present disclosure.

Referring to FIGS. 1 and 2, an example computer device 102 operates in one or both of a two dimensional (2D) space 110 and a three dimensional (3D) space 120, and an operating state controller 130 of the computer device 102 enables a plurality of operating states including one or more operating states that enable interoperability between the 2D space and the 3D space. For example, the operating states may include a 2D input/2D display operating state 132 (also referred to as 2D operating state), a 2D input/3D display operating state 134, a 3D input/2D display operating state 136, and a 3D input/3D display operating state 138 (also referred to as 3D operating state). The 2D input/3D display operating state 134 and the 3D input/2D display operating state 136 provide for 2D/3D interoperability.

For instance, computer device 102 may execute one or more applications 14 that generates and/or interacts with one or both of 2D space 110 and 3D space 120. The application 14 may be computer readable code or instructions executable to perform a game, an office productivity application, or any other type of application. The 2D space 110 may be presented on a 2D display 112, such as on a monitor of the computer device 102. Further, the user 103 may provide inputs into a first 2D input device 114, such as a keyboard in communication with the computer device 102 or a second 2D input device 116, such as a mouse in communication with the computer device 102, in order to provide commands and/or data that may be used by the one or more applications 14 in the 2D space 110. The 3D space 120 may be presented to the user 103 via a 3D display 122, such as a head mounted display (HMD) 105. The HMD 105 may be configured to provide virtual reality images (e.g., from at least one virtual environment input), mixed reality (MR) images (e.g., from at least two virtual environment inputs), and/or augmented reality (AR) images (e.g., from at least one virtual environment input and one real environment input). Also, the user 103 may provide inputs into a 3D input device 124, such as a virtual keyboard presented by the 3D display 122, in order to provide commands and/or data that may be used by the one or more applications 14 in the 3D space 120. Moreover, in some cases, the user 103 may desire to provide a 2D input for use with the 3D display 122, and/or to provide a 3D input for use with the 2D display 112.

In order to determine whether a user 103 is interacting with 2D or 3D interfaces, or if 2D/3D interoperability is desired, an operating state controller 130 may monitor a display context value 32 associated with a display being used by the user, and an input context value 34 associated with the one of the 2D space 110 or the 3D space 120 toward which a user input is being directed. For example, the 2D operating state 132 is associated with detecting a 2D input context and a 2D display context, the 2D input/3D display operating state 134 is associated with detecting a 2D input context and a 3D display context, the 3D input/2D display operating state 136 is associated with detecting a 3D input context and a 2D display context, and the 3D operating state 138 is associated with detecting a 3D input context and a 3D display context.

In an implementation, the operating state controller 130 may be in communication with a presence sensor 28, which monitors whether or not a head mounted display (HMD) 105 is in use by the user 103, and changes a value of the display context 32 accordingly. To determine whether the HMD 105 is in use, the presence sensor 28 may monitor movement of the HMD 105. For example, the presence sensor 28 may capture movement of the HMD 105 to determine whether the HMD is being placed over, for example, eyes of the user 103. This may be monitored based on HMD tracking information (e.g., a position and/or orientation of the HMD 105). Thus, when the user 103 puts on the HMD 105 while the HMD 105 is coupled to the computer device 102, the presence sensor 28 may instruct the operating state controller 130 to assign the display context value 32 a 3D value.

In some implementations, when the user 103 is wearing the HMD 105 and/or when the display context value 32 has the 3D value, any new application views may be placed into the 3D space 120, rather than being placed in the 2D space 110.

In contrast, when the HMD 105 is not worn by the user 103, when the HMD 105 is not present and/or plugged in, i.e., not coupled to the computer device 102, or when the user 103 removes the HMD 105, the presence sensor 28 may instruct the operating state controller 130 to assign the display context value 32 a 2D value. Thus, when the user 103 is not wearing the HMD 105 and/or the display context value 32 a 2D value, any new application views may be displayed in the 2D space 110.

In some implementations, the display context value 32 may be driven based on a simulation mode. For example, even when the HMD 105 is not attached (physically or wirelessly) to the computer device 102, the operating state controller 130 may still support the 2D input/3D display operating state 134 based on one or more signals from an HMD simulator 50 that simulates the HMD 105 being in use by the user 103 in lieu of the presence sensor 28 detecting such usage. In this way, the HMD simulator 50 may be used to change the display context value 32 from 2D to 3D even when then HMD 105 is not in use by the user 103.

In further implementations, each of the one or more applications 14 may be assigned a display context value 32 indicating where (e.g., the 2D space 110 or the 3D space 120) the one or more applications 14 is rendered and/or presented to the user 103. For example, for an application 14 shown in the 2D space 110, the display context value 32 may be a 2D value, whereas for an application 14 shown in the 3D space 120, the display context value 32 may be 3D value.

Also, in an implementation, the operating state controller 130 may be in communication with an input focus determiner 40, which monitors an input focus, e.g., a destination of user input into a keyboard and a mouse, and changes a value of the input context 34 accordingly. Thus, the input context value 34 may identify whether the user's input focus, e.g., user input to a mouse and/or a keyboard, is being used in the 2D space 110 or the 3D space 120. In some implementations, this may be based on whether the HMD 105 is currently worn by the user 103, as determined by the presence sensor 28. For example, when the HMD 105 is currently worn by the user 103, the input focus determiner 40 may determine that the window currently focused on is in the 3D space 120. In further implementations, the input focus determiner 40 may track whether the window currently being focused on is in the 2D space 110 or the 3D space 120 based on user interactions or new programs opening. In this way, the input focus determiner 40 monitors for changes in the foreground window, determines whether the foreground window is in the 2D space 110 or in the 3D space 120, and sets the input context value to either a 2D or 3D value accordingly. In some instances, the 3D space 120 may allow for interaction with the 2D space from within the HMD 105, and as such, the input context value 34 may indicate that the context may be in the 2D space 110 even when the display context value 32 may indicate the context may be in the 3D space 120.

The one or more applications 14 may be executed by a processor to present a graphical user interface and/or images, for example, VR, MR, or AR images, on the HMD 105 or a 2D display device 112. The one or more applications 14 may include, for example, different VR, MR, or AR applications (e.g., including MR and/or AR applications) that may generate a virtual environment in the 3D space 120. In addition, the one or more applications 14 may provide content for the virtual environment in the 3D space 120. For example, application 14 may provide a virtual game for the virtual environment or provide an object that may be used within virtual environment in the 3D space 120. In addition, or alternatively, the one or more applications 14 may also include, for example, applications that display the 2D space 110 in a 2D manner, e.g., on the 2D display device 112.

In some implementations, when the user 103 starts the computer device 102, the operating state controller 130 may select the 2D operating state 132, for example, as an initial default or based on user interaction. That is, the user 103 may be interacting with the 2D space 110 using one or more 2D inputs 114, 116 and 2D display 112. In further implementations, when the user 103 starts the computer device 102 and is wearing the HMD 105, the operating state controller 130 may select the 3D operating state 138. That is, the user 103 may be interacting with the 3D space 120 using 3D input 124 and 3D display 122.

In some implementations of transitioning to the 2D input/3D display operating state 134, while in the 2D operating state 132, the presence sensor 28 may be used to detect the user 103 putting on the HMD 105 while the HMD 105 is coupled to the computer device 102. In turn, the display context value 34 may change from 2D to 3D as a result of the display being utilized changing from the 2D display 112 to the 3D display 122. In this case, the operating state controller 130 may change from the 2D operating state 132 and select the 2D input/3D display operating state 134.

In some cases of transitioning to the 2D input/3D display operating state 134, the presence sensor 28 may be used to detect the user 103 putting on the HMD 105 and the input focus determiner 40 may detect the user 103 using an application 14 in the HMD 105, and as a result, may cause the computer device 102 may assign the foreground to the 3D space 120. For example, if the user 103 is using a word processing application 14 in the 2D space 110, the computer device 102 may automatically shift the foreground from the 2D display 112 to the 3D display 122. As a result, any keystrokes using the 2D input 114 or movements using the 2D input 116 may be directed to the application 14 in the 3D space 120. As a result, the operating state controller 130 selects the 2D input/3D display operating state 134.

In some instances of transitioning to the 3D operating state 138, when focus is assigned to the 3D space 120 and the HMD 105 is put on by the user 103, the input context value 34 may be automatically changed from 2D to 3D to match the display context value 32. As a result, the operating state controller 130 selects the 3D operating state 138.

As another example of transitioning to the 2D input/3D display operating state 134, when the focus of the user 103 is in the 3D space 120, the input context value 34 may be 3D. However, the computer device 102 may execute an operation in the 2D space 110 when the user 103 is using the HMD 105 that causes the foreground to shift from the HMD 105 to the 2D display 112. As a result, the input focus determiner 40 may shift the input context value 34 from 3D to 2D, even though the display context value 32 is still 3D. As a result, the operating state controller 130 selects the 2D input/3D display operating state 134. In this case, the computer device 102 may cause the application 14 to open in the HMD 105, rather than the 2D display 112, in response to opening 2D window while the user 103 is wearing the HMD 105.

In a further example of transitioning to the 3D input/2D display operating state 136, the presence sensor 28 may detect when the user 103 removes the HMD 105, and in response, the presence sensor 28 may notify the other components of the computer device 102 of such removal and that the display context value 32 has changed from 3D to 2D. As a result, the operating state controller 130 selects the 3D input/2D display operating state 136. In some implementations, the input focus determiner 40 may automatically cause the input context value 34 to change from 3D to 2D when the user 103 removes the HMD 105, thereby automatically changing the operating state to the 2D operating state 132. However, in some cases, the user 103 may be using the 2D display 112 while debugging a 3D application 14. In such cases, the input context value 34 may be remain, or may be changed back to, 3D. That is, in such an example, the input context value may be 3D, while the display context value may be 2D. As a result, the operating state controller 130 may select the 3D input/2D display operating state 136.

In further implementations, the computer device 102 may also include a toggle input detector 150, which may be configured to detect when the user provides a toggle input, such as entering a hotkey or a sequence of or combination of keys, to change or switch the display context value and/or the input context value. In effect, the toggle input may simulate the user 103 taking off or putting on the HMD 105, and may or may not change in the input context.

FIG. 5 illustrates transitions between operating states in response to receiving a toggle input in accordance with an implementation of the present disclosure. For example, as illustrated in FIG. 5, when the display context value and the input context value 34 are both 2D, receiving the toggle input simulates the HMD 105 being put on by the user 103 and moves the keyboard focus to the 3D space 120. As another example, as illustrated in FIG. 5, when the display context value 32 is 2D and the input context value 34 is 3D, receiving the toggle input simulates the HMD 105 being put on by the user 103 and leaves keyboard focus as-is. In yet another example, as illustrated in FIG. 5, when the display context value 32 is 3D and the input context value 34 is 2D, receiving the toggle input simulates the HMD 105 being taken off by the user 103 and moves the keyboard focus to the 3D space 120. In yet another example, as illustrated in FIG. 5, when the display context value 32 and the input context value are both 3D, receiving the toggle input simulates the HMD 105 being taken off by the user 103 and moves the keyboard focus to the 2D space 110.

In further implementations, when the computer device 102 is operating in any one of the 2D input, 3D display operating state 134, the 3D input, 2D display operating state 136, or the 3D operating state 138, the toggle input detector 150 may detect the user 103 entering the toggle input, and as a result, the operating state controller 130 may change the operating state back to the 2D operating state 132. That is, in some cases, receiving the toggle input may cause the computer device 102 to select a 2D window to receive focus and to simulate, if necessary, removing the HMD 105. In still further implementations, when the computer device 102 is operating in the 2D operating state 132, the toggle input detector 150 may detect the user 103 entering the toggle input, and as a result, the operating state controller 130 may change the operating state to the 3D operating state 138.

The computer device 102 may also include a memory configured for storing data and/or computer-executable instructions defining and/or associated with an operating system 106, and a processor that may execute the operating system. As an example, the memory can include, but is not limited to, a type of memory usable by a computer, such as random access memory (RAM), read only memory (ROM), tapes, magnetic discs, optical discs, volatile memory, non-volatile memory, and any combination thereof. As an example, the processor can include, but is not limited to, any processor specially programmed as described herein, including a controller, microcontroller, application specific integrated circuit (ASIC), field programmable gate array (FPGA), system on chip (SoC), or other programmable logic or state machine. Processor and/or memory may execute code that defines the functionality described herein to control an operating state of the computer device 102 and, in some cases, enable 2D/3D interoperability.

The computer device 102 may include any mobile or fixed computer device, which may be connectable to a network. The computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Thus, according to the present disclosure, computer device 102 is configured to enable interoperability between 2D and 3D interfaces, thereby unifying 2D and 3D operations on computer device 102.

As shown with respect to FIG. 2, the HMD 105 may include a headpiece 110, which may be a headband, arranged to be worn on the head of user, e.g., user 103 of FIG. 1. It should be appreciated by those of ordinary skill in the art that the HMD 105 may also be attached to the user's head using a frame (in the manner of conventional spectacles), helmet, or other fit system. The purpose of the fit system is to support the display and provide stability to the display and other head-borne systems such as tracking systems, sensors, and cameras. The HMD 105 may also include optical components 215 (e.g., one or more lenses), including waveguides that may allow the HMD 105 to project images generated by a light engine included within (or external) to the HMD 105. The optical components 215 may use plate-shaped (usually planar) waveguides for transmitting angular image information to users' eyes as virtual images from image sources located out of the user's line of sight. The image information may propagate along the waveguides as a plurality of angularly related beams that are internally reflected along the waveguide. Diffractive optics are often used for injecting the image information into the waveguides through a first range of incidence angles that are internally reflected by the waveguides as well as for ejecting the image information through a corresponding range of lower incidence angles for relaying or otherwise forming an exit pupil behind the waveguides in a position that can be aligned with the users' eyes. Both the waveguides and the diffractive optics at the output end of the waveguides may be at least partially transparent so that the user 103 can also view the real environment through the waveguides, such as when the image information is not being conveyed by the waveguides or when the image information does not fill the entire field of view.

The light engine (not shown), which may project images to be displayed on the optical components 215, may comprise a light source (e.g., a laser), a micro display and imaging optics in the form of a collimating lens. The micro display can be any type of image source, such as liquid crystal on silicon (LCoS) displays, liquid crystal displays (LCD), matrix arrays of LED's (whether organic or inorganic) and any other suitable display. The optical components 215 may focus a user's vision on one or more portions of one or more display panels. The display panels may display one or more images (e.g., left eye image and right eye image) based on signals received from the light engine. Thus, the optics may include left eye optics for focusing the user's left eye on the left eye image and right eye optics for focusing the user's right eye on the right eye image. For example, optical components 215 may focus the user's eyes on a central portion of each of the left eye image and the right eye image. The user's brain may combine the images viewed by each eye to create the perception that the user 103 is viewing a 3D environment.

The HMD 105 may also include a frame or slot (not shown) for coupling a smartphone or other portable computing device to the HMD 105 in a way that exposes the display screen of the smartphone to optical components 215. The HMD 105 may transition between AR, MR, and VR scenarios by causing the optical members to either pass light or block light, thereby either showing or hiding view of the real world while presenting virtual content to the user 103.

The computer device 102 may execute the following sample actions when the display context value 32 indicates that the HMD 105 is being utilized:
auto-launching a desktop application in the HMD 105 even though the input context value 34 indicates a 2D space;
disabling features of a virtual assistant;
enabling a 3D motion controller input; and
hiding a desktop mouse cursor.

The computer device 102 may also execute the following sample actions when the display context value 32 indicates that the 2D display 112 is being utilized:
disabling a gamepad input;
disabling a holographic keyboard; and
disabling 3D components from stealing foreground from 2D space windows.

The computer device 102 execute may execute the following sample actions whenever the display context value 32 changes:
changing how secondary tiles API are handled;
changing how web authentication brokers work, e.g., selecting a holographic version for HMD;
changing rendering and logic for system notifications;
changing banner visibility;
changing where a digital assistant will appear;
changing which file picker is used;
determining how the system should behave while using a simulated HMD;
hiding a "soft" keyboard on the desktop;
changing how speech APIs interpret speech;
determining whether the 2D space reacts to speech input; and
ignoring windows displayed in the HMD.

The computer device 102 may execute the following sample actions when the input context value 34 indicates that the 2D display 112 is being utilized:
auto-launching the desktop application in the HMD 105.

The computer device 102 may execute the following sample actions when the input context value 34 indicates that the HMD 105 is being utilized:
disabling hotkeys in a browser window; and
disabling game bar hotkeys and other shortcuts.

The computer device 102 execute may execute the following sample actions whenever the input context value 34 changes:
toggling visibility of a holographic input banner, e.g., a notification that a keyboard sequence can be pressed to use a mouse on the 2D display 112 while the user 103 is wearing the HMD 105.

It should be appreciated by those of ordinary skill in the art that the aforementioned sample actions are merely example actions that are performed by the computer device 102 and that other actions may also be performed by the computer device 102 based on the display context value and the input context value.

Figure 3:
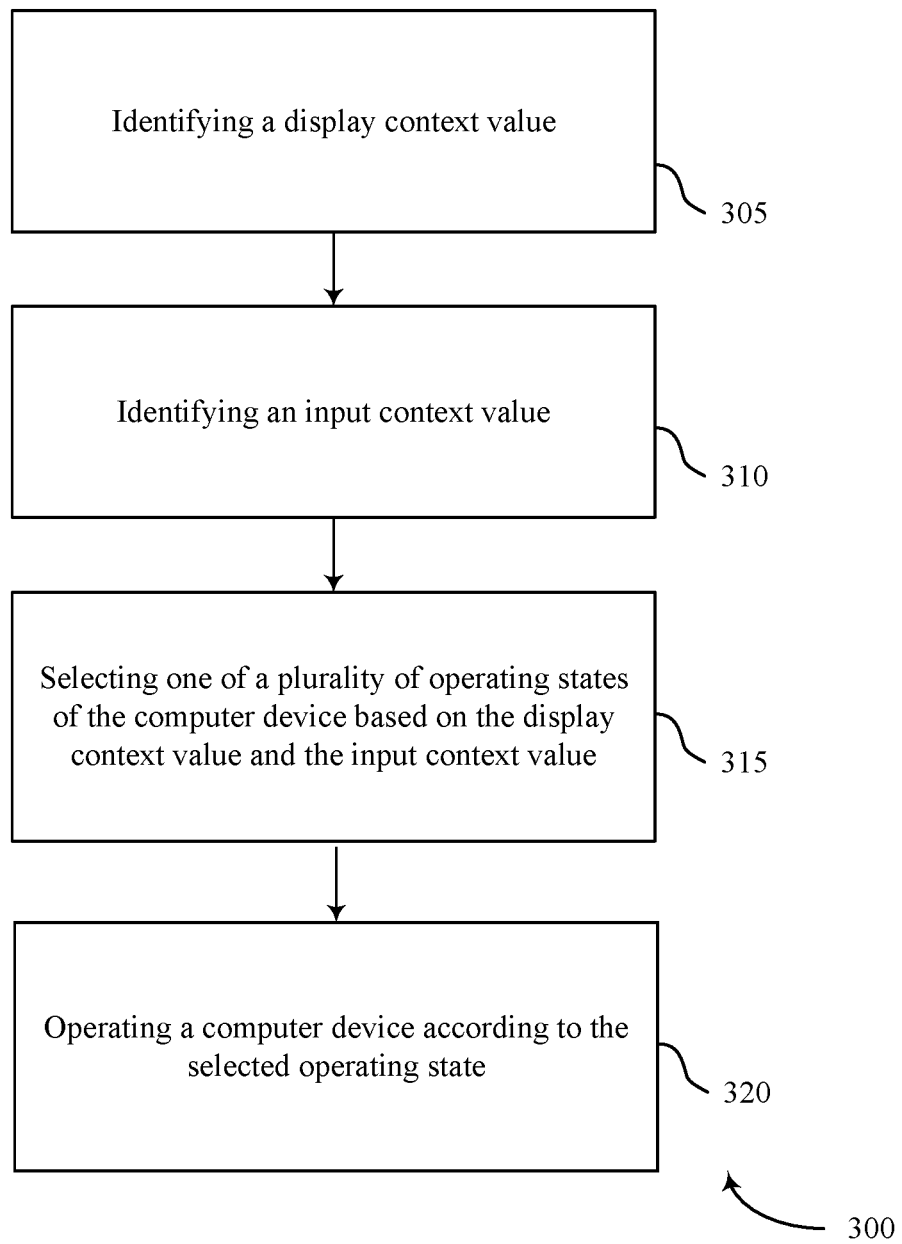
FIG. 3 is a flowchart of an example method for operating a computer device having interoperable 2D and 3D interfaces in accordance with an implementation of the present disclosure.

Referring now to FIG. 3, an example method 300 for controlling an operating state that may be used by the computer device 102 (FIG. 1).

At 305, the method 300 may include identifying a display context value that indicates whether a user is viewing a two dimensional (2D) display of a 2D space or a three dimensional (3D) display of a 3D space of the computer device. For example, in an implementation, computer device 102 may operate a presence sensor 28 (FIG. 1) to identify a display context value that indicates whether a user is viewing a two dimensional (2D) display of a 2D space or a three dimensional (3D) display of a 3D space of the computer device.

At 310, the method 300 may include identifying an input context value that indicates whether a user input received at an input device is directed toward the 2D space or the 3D space of the computer device. For example, the computer device 102 may execute an input focus determiner 40 (FIG. 1) to a identify an input context value that indicates whether a user input received at an input device is directed toward the 2D space or the 3D space of the computer device.

In some implementations, the display context value may be based on use of a head-mounted display (HMD) by the user and the input context value may be based on whether the input from a keyboard and/or mouse is directed to the 2D space or the 3D space. The display context value may also indicate the 3D display is being used when the HMD is in use, and the display context value may indicate the 2D display is being used when the HMD is not in use.

In further implementations, the method may also include changing from either a 2D input/2D display operating state to the 2D input/3D display operating state, or from the 3D input/2D display operating state to a 3D input/3D display operating state, when the HMD is detected as being in use while the HMD is coupled to the computer device. The method may also include changing from either the 2D input/3D display operating state to the 2D input/2D display operating state, or from the 3D input/3D display operating state to the 3D input/2D display operating state, when the HMD is detected as not being in use while the HMD is coupled to the computer device.

In some implementations, identifying the input context value may include identifying an active foreground window, identifying a 2D value or a 3D value of the display context of the active foreground window, and setting the input context value to match the 2D value or the 3D value of the display context.

At 315, the method 300 may further include selecting one of a plurality of operating states of the computer device based on the display context value and the input context value. For example, computer device 102 may execute operating state controller 130 (FIG. 1) to select one of a plurality of operating states of the computer device based on the display context value and the input context value, where the plurality of operating states include 2D/3D interoperability operating states. In some implementations, for example, the plurality of operating states include a 2D input/3D display operating state and a 3D input/2D display operating state. In some implementations, the operating state is selected such that the input is selected to match the identified input context value and the display is selected to match the identified display context value.

At 320, the method 300 may further include operating the computer device according to the selected operating state. For example, in an implementation, computer device 102 may execute processor 56 (FIG. 4) to operate the computer device 102 according to the selected operating state. In other words, processor 56 receives 2D or 3D inputs and generates 2D or 3D outputs based on the corresponding input context and display context of the selected operating state.

In some instances, the operating state of the computer device 102 may be changed from the selected operating state to a different one of the plurality of operating states. For example, the method may further include changing from either a 2D input/2D display operating state to the 2D input/3D display operating state, or from the 3D input/2D display operating state to a 3D input/3D display operating state, when the HMD is detected as being in use while the HMD is coupled to the computer device. The method may also include changing from either the 2D input/3D display operating state to the 2D input/2D display operating state, or from the 3D input/3D display operating state to the 3D input/2D display operating state, when the HMD is detected as not being in use while the HMD is coupled to the computer device.

Figure 4:
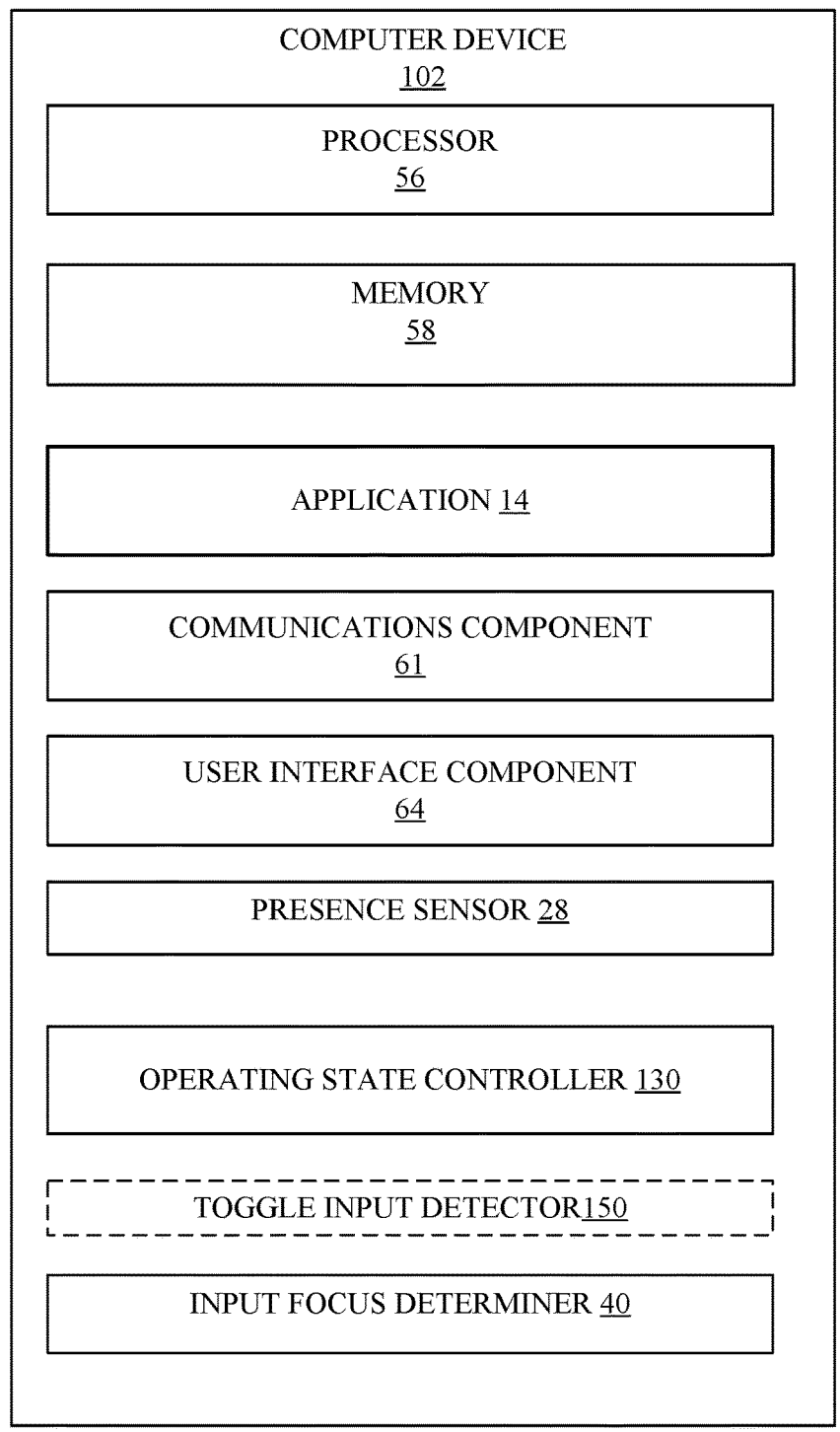
FIG. 4 is a schematic block diagram of an example computer device in accordance with an implementation of the present disclosure.

In still further implementations, the method may include receiving a toggle input from the user to change the operating state of the computer device and changing the selected one of the plurality of operating states in response to the toggle input. For example, the method may include changing the selected operating state from the 2D input/3D display operating state, the 3D input/2D display operating state, or a 3D input/3D display operating state to a 2D input/2D display operating state upon receiving the toggle input from the user. As another example, the method may include changing the selected operating state from the 2D input/2D display operating state or the 3D input/2D display to the 3D input/3D display operating state upon receiving the toggle input from the user Referring now to FIG. 4, illustrated is an example computer device 102 in accordance with an implementation, including additional component details as compared to FIG. 1. As noted above, in some examples, components illustrated as part of the computer device 102 may also be implemented directly within the display device 105. In such situations, the term "computer device" may also refer to stand alone display device(s) such as, desktops, laptops, smart phones, or tablets. In one example, the computer device 102 may include processor 56 for carrying out processing functions associated with one or more of components and functions described herein. Processor 56 can include a single or multiple set of processors or multi-core processors. Moreover, processor 56 can be implemented as an integrated processing system and/or a distributed processing system.

The computer device 102 may further include memory 58, such as for storing local versions of applications being executed by processor 56. Memory 58 can include a type of memory usable by a computer, such as random access memory (RAM), read only memory (ROM), tapes, magnetic discs, optical discs, volatile memory, non-volatile memory, and any combination thereof. Additionally, processor 56 and memory 58 may include and execute operating system 106 (FIG. 1).

Further, computer device 102 may include a communications component 61 that provides for establishing and maintaining communications with one or more parties utilizing hardware, software, and services as described herein. Communications component 61 may carry communications between components on the computer device 102, as well as between the computer device 102 and external devices, such as devices located across a communications network and/or devices serially or locally connected to the computer device 102, such as HMD 105 (FIG. 2). For example, communications component 61 may include one or more buses, and may further include transmit chain components and receive chain components associated with a transmitter and receiver, respectively, operable for interfacing with external devices.

Additionally, the computer device 102 may also include a presence sensor 28, which monitors whether or not a head mounted display (HMD) 105 is in use by the user 103. To determine whether the HMD 105 is in use, the presence sensor 28 may monitor movement of the HMD 105. For example, the presence sensor 28 may capture movement of the HMD 105 to determine whether the HMD is being placed over, for example, eyes of the user 103. This may be monitored based on HMD tracking information (e.g., a position and/or orientation of the HMD 105).

The computer device 102 may also include an input focus determiner 40, which monitors an input focus, e.g., a keyboard and a mouse, and changes a value of the input context 34 accordingly. In some instances, the input focus determiner 40 may determine whether a window currently focused on is in the 2D space 110 or the 3D space 120. For example, the input focus determiner 40 may track whether the window currently being focused on is in the 2D space 110 or the 3D space 120 based on user interactions or new programs opening. In this way, the input focus determiner 40 monitors for changes in the foreground window, determines whether the foreground window is in the 2D space 110 or in the 3D space 120, and sets the input context value to either a 2D or 3D value accordingly. In some instances, the 3D space 120 may allow for interaction with the 2D space from within the HMD, and as such, the input context value 34 may indicate that the context may be in the 2D space 110 even when the display context value 32 may indicate the context may be in the 3D space 120.

In further implementations, the computer device 102 may also include a toggle input detector 150, which may be configured to detect when the user provides a toggle input, such as entering a hotkey or a sequence of or combination of keys, to change or switch the display context value and/or the input context value.

The computer device 102 may also include an operating state controller 130 that enables a plurality of operating states, namely a 2D input/2D display operating state 132 (also referred to as 2D operating state), a 2D input/3D display operating state 134, a 3D input/2D display operating state 136, and a 3D input/3D display operating state 138 (also referred to as 3D operating state). In some implementations, the 2D input/3D display operating state 134 and the 3D input/2D display operating state 136 provide for 2D/3D interoperability operating states.

The computer device 102 may also include a user interface component 64 operable to receive inputs from a user 103 of the computer device 102 and further operable to generate outputs for presentation to the user 103. User interface component 64 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user 103, or any combination thereof. In an implementation, user interface component 64 may transmit and/or receive messages corresponding to the operation of applications 14.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of operating a computer device, comprising:
    identifying a display context value in response to usage of a head-mounted display (HMD) that indicates that a user is viewing a two dimensional (2D) display of a 2D space of the computer device in response to the HMD not being in use or that indicates that the user is viewing a three dimensional (3D) display of a 3D space of the computer device in response to the HMD being in use;
    identifying an input context value that indicates whether a user input received at an input device is directed toward the 2D space or the 3D space of the computer device;
    selecting one of a plurality of operating states of the computer device based on the display context value and the input context value, the plurality of operating states including a 2D input/3D display operating state and a 3D input/2D display operating state; and
    operating the computer device according to the selected operating state.

2. The method of claim 1, wherein:
    the input context value is based on whether the user input from a keyboard and/or mouse is directed to the 2D space or the 3D space.

3. The method of claim 2, further comprising:
    changing from either a 2D input/2D display operating state to the 2D input/3D display operating state, or from the 3D input/2D display operating state to a 3D input/3D display operating state, when the HMD is detected as being in use while the HMD is coupled to the computer device; and
    changing from either the 2D input/3D display operating state to the 2D input/2D display operating state, or from the 3D input/3D display operating state to the 3D input/2D display operating state, when the HMD is detected as not being in use while the HMD is coupled to the computer device.

4. The method of claim 1, wherein identifying the input context value comprises:
    identifying an active foreground window;
    identifying a 2D value or a 3D value of the display context value of the active foreground window; and
    setting the input context value to match the 2D value or the 3D value of the display context value.

5. The method of claim 1, further comprising:
    receiving a toggle input from the user to change the operating state of the computer device; and
    changing the selected operating state in response to the toggle input.

6. The method of claim 5, further comprising:
    changing the selected operating state from the 2D input/3D display operating state, the 3D input/2D display operating state, or a 3D input/3D display operating state to a 2D input/2D display operating state upon receiving the toggle input from the user; and
    changing the selected operating state from the 2D input/2D display operating state or the 3D input/2D display to the 3D input/3D display operating state upon receiving the toggle input from the user.

7. A computer device for selecting an operating state, comprising:
    a memory to store data and instructions; and
    a processor in communication with the memory to execute the instructions to:
    identify a display context value in response to usage of a head-mounted display (HMD) that indicates that a user is viewing a two dimensional (2D) display of a 2D space of the computer device in response to the HMD not being in use or that indicates that the user is viewing a three dimensional (3D) display of a 3D space of the computer device in response to the HMD being in use;
    identify an input context value that indicates whether a user input received at an input device is directed toward the 2D space or the 3D space of the computer device;
    select one of a plurality of operating states of the computer device based on the display context value and the input context value, the plurality of operating states including a 2D input/3D display operating state and a 3D input/2D display operating state; and
    operate the computer device according to the selected operating state.

8. The computer device of claim 7, wherein:
    the input context value is based on whether the user input from a keyboard and/or mouse is directed to the 2D space or the 3D space.

9. The computer device of claim 8, wherein the instructions are further executable to:
    change from either a 2D input/2D display operating state to the 2D input/3D display operating state, or from the 3D input/2D display operating state to a 3D input/3D display operating state, when the HMD is detected as being in use while the HMD is coupled to the computer device; and
    change from either the 2D input/3D display operating state to the 2D input/2D display operating state, or from the 3D input/3D display operating state to the 3D input/2D display operating state, when the HMD is detected as not being in use while the HMD is coupled to the computer device.

10. The computer device of claim 7, wherein identifying the input context value comprises:
    identify an active foreground window;
    identify a 2D value or a 3D value of the display context value of the active foreground window; and
    set the input context value to match the 2D value or the 3D value of the display context value.

11. The computer device of claim 10, wherein the instructions are further executable to:
    receive a toggle input from the user to change the operating state of the computer device; and
    change the selected operating state in response to the toggle input.

12. The computer device of claim 11, wherein:
    changing the selected operating state from the 2D input/3D display operating state, the 3D input/2D display operating state, or a 3D input/3D display operating state to a 2D input/2D display operating state upon receiving the toggle input from the user; and
    changing the selected operating state from the 2D input/2D display operating state or the 3D input/2D display to the 3D input/3D display operating state upon receiving the toggle input from the user.

13. A non-transitory computer-readable medium storing instructions executable by a computer device, the instructions comprising code for:

identifying a display context value in response to usage of a head-mounted display (HMD) that indicates that a user is viewing a two dimensional (2D) display of a 2D space of the computer device in response to the HMD not being in use or that indicates that the user is viewing a three dimensional (3D) display of a 3D space of the computer device in response to the HMD being in use;

identifying an input context value that indicates whether a user input received at an input device is directed toward the 2D space or the 3D space of the computer device;

selecting one of a plurality of operating states of the computer device based on the display context value and the input context value, the plurality of operating states including a 2D input/3D display operating state and a 3D input/2D display operating state; and operating the computer device according to the selected operating state.

14. The non-transitory computer-readable medium of claim 13, wherein:

the input context value is based on whether the user input from a keyboard and/or mouse is directed to the 2D space or the 3D space.

15. The non-transitory computer-readable medium of claim 14, the instructions further comprising code for:

changing from either a 2D input/2D display operating state to the 2D input/3D display operating state, or from the 3D input/2D display operating state to a 3D input/3D display operating state, when the HMD is detected as being in use while the HMD is coupled to the computer device; and changing from either the 2D input/3D display operating state to the 2D input/2D display operating state, or from the 3D input/3D display operating state to the 3D input/2D display operating state, when the HMD is detected as not being in use while the HMD is coupled to the computer device.

16. The non-transitory computer-readable medium of claim 13, the instructions further comprising code for:

identifying an active foreground window;

identifying a 2D value or a 3D value of the display context value of the active foreground window; and setting the input context value to match the 2D value or the 3D value of the display context value.

17. The non-transitory computer-readable medium of claim 13, the instructions further comprising code for:

receiving a toggle input from the user to change the operating state of the computer device;

changing the selected operating state from the 2D input/3D display operating state, the 3D input/2D display operating state, or a 3D input/3D display operating state to a 2D input/2D display operating state upon receiving the toggle input from the user; and changing the selected operating state from the 2D input/2D display operating state or the 3D input/2D display to the 3D input/3D display operating state upon receiving the toggle input from the user.

18. A method of operating a computer device, comprising:

identifying a display context value that indicates whether a user is viewing a two dimensional (2D) display of a 2D space or a three dimensional (3D) display of a 3D space of the computer device, wherein the display context value is based on use of a head-mounted display (HMD) by the user;

identifying an input context value that indicates whether a user input received at an input device is directed toward the 2D space or the 3D space of the computer device, wherein the input context value is based on whether the user input from a keyboard or mouse is directed to the 2D space or the 3D space;

selecting one of a plurality of operating states of the computer device based on the display context value and the input context value, the plurality of operating states including a 2D input/3D display operating state and a 3D input/2D display operating state;

operating the computer device according to the selected operating state;

changing from either a 2D input/2D display operating state to the 2D input/3D display operating state, or from the 3D input/2D display operating state to a 3D input/3D display operating state, when the HMD is detected as being in use while the HMD is coupled to the computer device; and changing from either the 2D input/3D display operating state to the 2D input/2D display operating state, or from the 3D input/3D display operating state to the 3D input/2D display operating state, when the HMD is detected as not being in use while the HMD is coupled to the computer device.

19. A computer device for selecting an operating state, comprising:

a memory to store data and instructions; and a processor in communication with the memory to execute the instructions to:

identify a display context value that indicates whether a user is viewing a two dimensional (2D) display of a 2D space or a three dimensional (3D) display of a 3D space of the computer device, wherein the display context value is based on use of a head-mounted display (HMD) by the user;

identify an input context value that indicates whether a user input received at an input device is directed toward the 2D space or the 3D space of the computer device, wherein the input context value is based on whether the user input from a keyboard or mouse is directed to the 2D space or the 3D space;

select one of a plurality of operating states of the computer device based on the display context value and the input context value, the plurality of operating states including a 2D input/3D display operating state and a 3D input/2D display operating state;

operate the computer device according to the selected operating state;

change from either a 2D input/2D display operating state to the 2D input/3D display operating state, or from the 3D input/2D display operating state to a 3D input/3D display operating state, when the HMD is detected as being in use while the HMD is coupled to the computer device; and change from either the 2D input/3D display operating state to the 2D input/2D display operating state, or from the 3D input/3D display operating state to the 3D input/2D display operating state, when the HMD is detected as not being in use while the HMD is coupled to the computer device.

20. A non-transitory computer-readable medium storing instructions executable by a computer device, the instructions comprising code for:

identifying a display context value that indicates whether a user is viewing a two dimensional (2D) display of a 2D space or a three dimensional (3D) display of a 3D space of the computer device, wherein the display context value is based on use of a head-mounted display (HMD) by the user;

identifying an input context value that indicates whether a user input received at an input device is directed toward the 2D space or the 3D space of the computer device, wherein the input context value is based on whether the user input from a keyboard or mouse is directed to the 2D space or the 3D space;

selecting one of a plurality of operating states of the computer device based on the display context value and the input context value, the plurality of operating states including a 2D input/3D display operating state and a 3D input/2D display operating state;

operating the computer device according to the selected operating state;

changing from either a 2D input/2D display operating state to the 2D input/3D display operating state, or from the 3D input/2D display operating state to a 3D input/3D display operating state, when the HMD is detected as being in use while the HMD is coupled to the computer device; and changing from either the 2D input/3D display operating state to the 2D input/2D display operating state, or from the 3D input/3D display operating state to the 3D input/2D display operating state, when the HMD is detected as not being in use while the HMD is coupled to the computer device.

* * * * *